Figure 1:
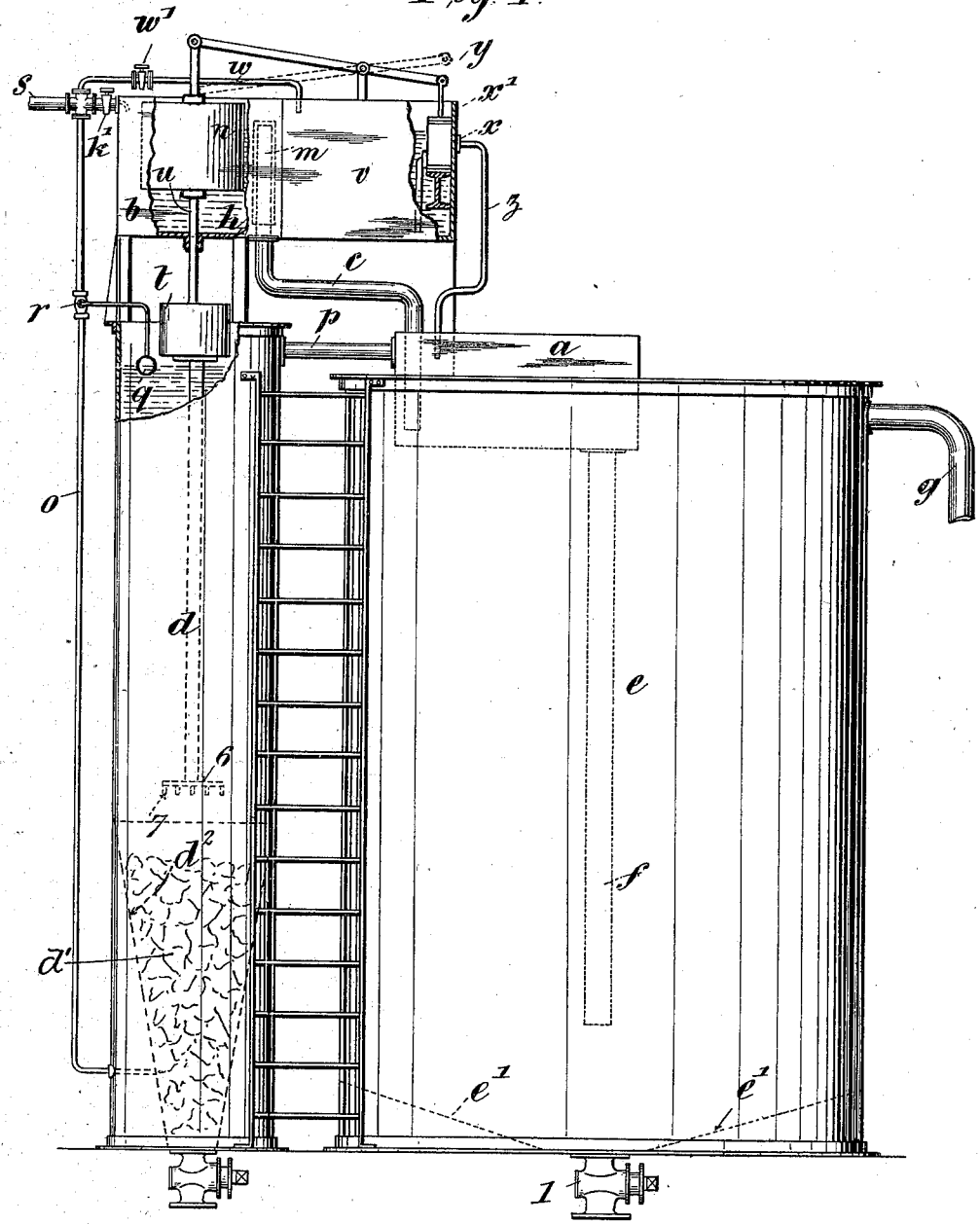

No. 731,902. PATENTED JUNE 23, 1903.
S. H. HODGKIN.
WATER PURIFYING AND SOFTENING APPARATUS.
APPLICATION FILED JULY 21, 1902.
NO MODEL. 3 SHEETS—SHEET 1.

Witnesses.
W. Cross.
Geo Babington Price

Inventor.
Stanley H. Hodgkin

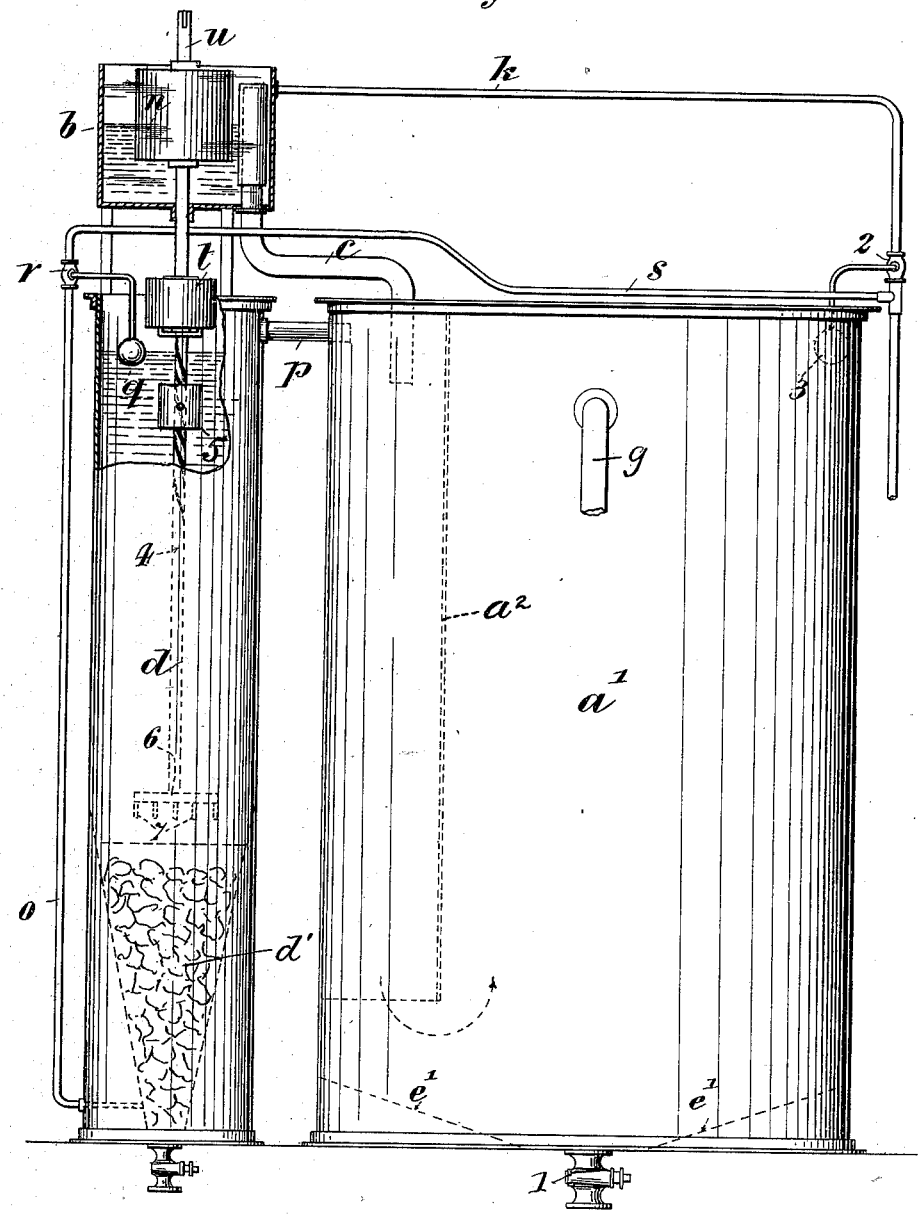

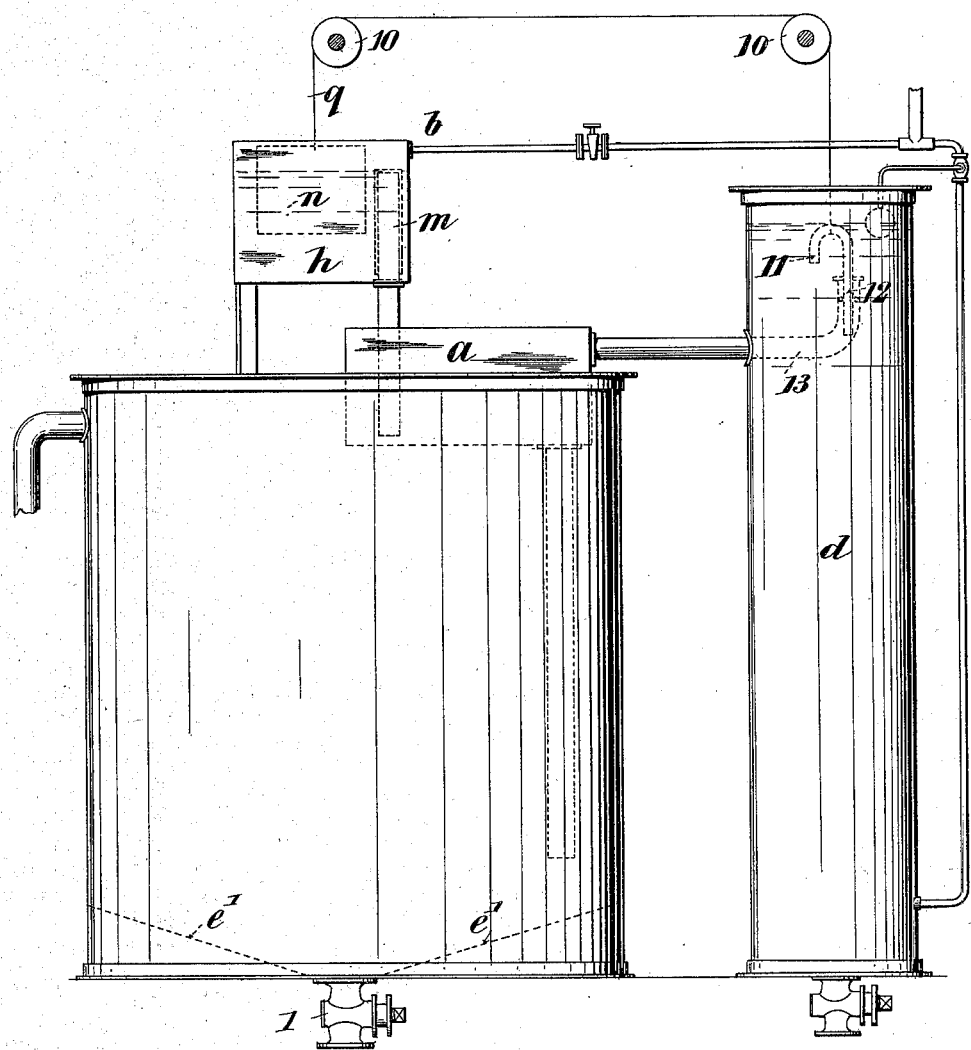

No. 731,902.

Patented June 23, 1903.

UNITED STATES PATENT OFFICE.

STANLEY HOWARD HODGKIN, OF LONDON, ENGLAND.

WATER PURIFYING AND SOFTENING APPARATUS.

SPECIFICATION forming part of Letters Patent No. 731,902, dated June 23, 1903.

Application filed July 21, 1902. Serial No. 116,399. (No model.)

*To all whom it may concern:*

Be it known that I, STANLEY HOWARD HODGKIN, a subject of the King of Great Britain and Ireland, residing at London, England, have invented Improvements in or Relating to Water Purifying and Softening Apparatus, of which the following is a specification.

This invention has reference to water purifying and softening apparatus of the kind in which a solution of lime, milk of lime, or other liquid chemical reagent is mixed with the water to be purified and softened; and it has for its object to enable the water to be treated and the lime-water or other reagent to be mixed in definite proportions without using regulating cocks or valves or openings, which are liable to soon become inoperative if brought in contact with lime-water.

It also has for its object to provide means whereby lime or other solid chemical substance used for making the lime-water or other solution used for purifying and softening the water shall be stirred or agitated from time to time in an automatic manner, so as to admit of water readily mixing with it and forming lime-water or other liquid reagent.

It also has for its object to provide an improved construction and arrangement of water purifying and softening apparatus, hereinafter referred to as "water-softening apparatus."

The invention consists for these and other purposes in various novel features of construction and combinations and arrangements of parts, all as hereinafter described, and pointed out in the claims.

In the accompanying illustrative drawings, Figure 1 shows in side elevation one construction of water-softening apparatus according to this invention. Figs. 2 and 3 are similar views to Fig. 1, showing modified arrangements.

In the construction of water-softening apparatus shown in Fig. 1 the water to be softened is caused to enter a mixing vessel $a$ in definite quantities through an automatic flushing apparatus $b$ and a discharge-pipe $c$, and a definite quantity of the liquid reagent used is caused by displacement to pass from a vertical reagent-tank $d$ into the mixing vessel $a$ for each charge of water supplied to the latter vessel $a$ by the flushing apparatus $b$.

In the example the mixing vessel $a$ is arranged above a vertical settling-tank $e$, that is preferably of comparatively large dimensions and into which a discharge-pipe $f$ from the mixing vessel $a$ dips to a considerable depth. The said settling-tank $e$ is preferably formed with a conical bottom $e'$ and is provided at the top with an outlet-pipe $g$ for softened water. The flushing apparatus comprises a tank $h$, having a hard-water-inlet pipe $k$, provided with a valve $k'$, a siphon outlet $m$, that is of ordinary construction and is in connection with the discharge-pipe $c$, and a vertically-movable float $n$. The reagent-tank $d$ is arranged below the flushing apparatus and is charged with a solid reagent $d'$—for example, lime—from which the liquid reagent is to be made. To the lower end of this tank is connected an inlet-pipe $o$, through which water is caused to enter the lower end of the tank, and by flowing up through the solid reagent $d'$ therein produces the required solution of such reagent. To the upper end of the tank $d$ is connected a pipe $p$, through which definite quantities of the liquid reagent produced are caused to pass in an intermittent manner into the mixing vessel $a$. The supply of water to the pipe $o$ and reagent-tank $d$ is controlled by a ball or float $q$, governed by the level of the liquid reagent in the said tank and arranged to open and close a valve $r$ on the inlet-pipe $o$, which may, as shown, be connected to the hard-water-supply pipe $s$, connected to the water-inlet $k$. The interior of the tank $d$ may advantageously be made of truncated conical shape, as indicated in dotted lines at $d^2$.

For displacing liquid reagent from the tank $d$ there is used a displacing device consisting in the example of a vertically-movable body $t$, arranged to dip into the liquid reagent in the tank $d$ and carried by a rod $u$, connected to the float $n$. When it is desired to also mix another reagent, such as a solution of soda-ash, with the hard water for softening it, as is sometimes done, such reagent may be placed in another tank $v$, arranged by the side of the flushing apparatus and provided with a water-inlet pipe $w$, connected to the water-supply pipe s, and with a lift-pump x, the double piston x' of which is worked by a lever y from the float n in the flushing apparatus and the delivery-outlet of which is connected to a soda-delivery pipe z, arranged to discharge into the mixing vessel a. The pipe w is provided with a valve w'.

The operation of the apparatus is as follows: Assuming the tank d to have been charged with lime d' and the valve k' to have been closed and the valve r opened, then upon opening the water-supply pipe k water will flow through the pipe o into the tank d and by coming into contact with the lime therein will produce lime-water, the level of which will rise to such a height, as through the ball or float q, as to close the valve r before it can reach the bottom of the outlet-pipe p. Upon afterward opening the valve k' hard water will be admitted to the tank h of the flushing apparatus, which will become gradually charged with water and raise the float n and displacing-body t until the level of the water reaches a height sufficient to start the siphon m, whereupon the water will be automatically discharged through the pipe c into the mixing vessel a and the float n will fall and cause the displacing-body t to descend into the lime-water in the tank d and displace a definite quantity thereof, which will be caused to enter the mixing vessel a through the pipe p simultaneously with the hard water entering such vessel through the pipe c, the mixed water and reagent flowing off through the pipe f into the bottom of the settling-tank e, from the top of which an equivalent quantity of softened water will by displacement flow off through the outlet-pipe g. When the float again rises, the valve r reopens. When a solution of soda-ash is also to be used, the soda-tank v is charged with soda-ash and sufficient water is admitted thereto through the pipe w and valve w' to produce a solution of soda-ash of the desired strength, after which the valve w' is closed. Then each time the float n in the flushing apparatus rises the barrel of the soda-pump x will be charged with a definite quantity of solution of soda-ash, that will be lifted by the lever y and double piston x' and discharged through the pipe z into the mixing vessel a each time the siphon m acts and the float falls.

In Fig. 1 the mass d' of lime in the tank d is stirred or agitated more or less by the stream of water caused to pass through it from the inlet-pipe o, so as to produce lime-water. In some cases the mass of lime may be stirred or agitated directly by a stirring device worked mechanically from a float in the flushing apparatus or indirectly, as by forcing water or air or water and air through the said mass by a pump worked from a moving part of the flushing apparatus.

Fig. 2 shows a modified construction of water-softening apparatus, wherein a mechanically-operated stirring device is used. In this arrangement a mixing vessel a' and reagent-tank d are arranged side by side and connected together at the top by a pipe p, the mixing vessel being of greater depth and capacity than in the arrangement shown in Fig. 1 and provided with a vertical pipe or diaphragm $a^2$, so that it will also serve as a settling vessel, which is provided with a draw-off pipe g at the top. The reagent-tank has its interior of inverted truncated conical shape and adapted to hold a mass d' of lime in its lower portion, as in the apparatus shown in Fig. 1. The said vessel a and tank d may be open at the top. Above the tank d is arranged an automatic water-flushing apparatus b, which may be of any known or suitable construction, such as that shown in Fig. 1 and hereinbefore described, and which has its inlet-pipe k adapted to be connected by the pipes to the source from which the water to be treated is to be supplied and its outlet c connected to the upper part of the mixing vessel a'. The water-inlet pipe k is in this case governed by a cock 2, controlled by a float 3 in the mixing vessel a' or in a vessel in communication therewith in such a way that when the level of the water in the said mixing vessel rises to a predetermined height the further supply of water to the flushing apparatus b, and consequently to the mixing vessel a', will be automatically cut off, the supply being automatically again turned on when the said level falls. Within the flushing apparatus is a vertically-movable float n, as in Fig. 1. Connected to this float by a swivel-joint is a screw-threaded rod 4, that extends down into the tank d through a fixed nut 5 or equivalent and is provided at its lower end with a stirring or agitating device comprising, for example, a bar or plate 6, carrying a number of depending teeth, blades, or projecting parts 7, that are caused to rotate and fall upon and enter the mass d' of lime in the bottom portion of the tank d each time the float falls, thereby breaking up or stirring the mass d' of lime and causing it to assume a condition in which water can readily flow through it and form therewith the required lime-water. Water is supplied to the lower end of the tank d through a pipe o, provided with a cock r, controlled by a float q in the upper end of the tank or in a receptacle in connection therewith, so as to cut off the supply of water to the tank when the level of the lime-water therein reaches a predetermined height, as in Fig. 1. Connected to the float in the flushing apparatus b is a rod u, carrying a displacer t, as and for the purpose hereinbefore described with reference to Fig. 1. The displacer t may in each case be made vertically adjustable on its rod u, so as to admit of the amount of lime-water it displaces at each downward movement being adjusted from time to time to suit requirement. It may also be arranged to work in a fixed guide. The working of this modified arrangement is like that shown in Fig. 1, except that the working of the flushing apparatus is controlled by the level of the liquid in the combined mixing and settling vessel $a'$.

The apparatus shown in Fig. 1 may also be provided, as shown in dotted lines in that figure, with a mechanically-operated stirring device 6 and 7 of the kind hereinbefore described.

The mechanically-operated stirring device may in many cases be dispensed with, the water entering the tank $d$ by the pipe $o$ serving to stir or agitate the mass of lime to a sufficient extent to admit of the free passage of water therethrough and the preparation of lime-water therefrom.

In some cases, as when the chemical reagent or reagents used for purifying and softening water can be readily dissolved and is or are contained in solution in one or more suitable vessels, the motion of the automatic flushing apparatus can be utilized to start one or more supplementary siphons for supplying a charge of the said reagent or reagents to the mixing vessel. Fig. 3 shows the apparatus modified for this purpose. In this case the float $n$ of the flushing apparatus $b$ is connected by a flexible connector $q$, passing over guide-pulleys 10 to a vertically-movable siphon, the short leg 11 of which terminates in the top of the reagent-tank $d$ and the longer leg 12 of which works in a liquid-tight manner through the upper end of a pipe 13, the lower end of which discharges into the mixing vessel $a$, which in this example is shown below the flushing apparatus. The arrangement is such that when the float $n$ rises it will lower the siphon 11 12 sufficiently in the liquid reagent to cause it to start at or about the same time that the siphon $m$ in the flushing apparatus starts, definite quantities of hard water from the flushing-tank $h$ and liquid reagent from the reagent-tank $d$ flowing simultaneously through the two siphons into the mixing vessel until the lower ends of the shorter legs of each siphon are uncovered by the liquids, when they cease to act until the level of water and the float again rise to the necessary extent in the flushing-tank $h$.

It will be evident that other changes could be made in the details of construction of my apparatus without departing from the spirit and scope of the invention, so long as relative arrangement of parts shown in the drawings or the mode of operation described in the specification is preserved.

What I claim is—

1. Water-softening apparatus comprising a water-mixing vessel, an automatic intermittent water-flushing apparatus arranged to discharge into said mixing vessel, a liquid-reagent tank arranged to discharge into said mixing vessel, and a displacing device controlled by the rise and fall of water admitted to and discharged from said flushing apparatus for causing a definite quantity of liquid reagent to pass from said tank to said mixing vessel each time said flushing apparatus is operated.

2. Water-softening apparatus comprising a water-mixing vessel, an automatic water-flushing apparatus arranged to discharge into said mixing vessel, a liquid-reagent tank arranged to discharge into said mixing vessel, a pipe for admitting liquid to said tank, a float-operated valve for controlling the passage of liquid through said pipe to said tank and dependent for its operation upon the level of liquid in said tank, and means controlled by said flushing apparatus for causing a definite quantity of liquid reagent to pass from said tank to said mixing vessel each time said flushing apparatus is operated.

3. Water-softening apparatus comprising a water-mixing vessel, an automatic intermittent water-flushing apparatus arranged to discharge into said mixing vessel, a liquid-reagent tank arranged to discharge into said mixing vessel, a displacing device controlled by the rise and fall of water admitted to and discharged from said flushing apparatus for causing a definite quantity of liquid reagent to pass from said tank to said mixing vessel each time said flushing apparatus operates, and means operated from said flushing apparatus for stirring or agitating solid reagent in said tank.

4. Water-softening apparatus comprising a water-mixing vessel, an automatic intermittent water-flushing apparatus arranged to discharge into said mixing vessel, a liquid-reagent tank arranged to discharge into said mixing vessel, and a displacing device controlled by the rise and fall of water admitted to and discharged from said flushing apparatus and adapted to cause a definite quantity of liquid reagent to pass from said tank to said mixing vessel each time said flushing apparatus is operated.

5. Water-softening apparatus comprising a water-mixing vessel, a siphon water-flushing apparatus arranged to discharge into said mixing vessel and provided with a vertically-movable body arranged to be raised and lowered by the rise and fall of water admitted to and discharged from said flushing apparatus, a liquid-reagent tank arranged to discharge into said mixing vessel, and a displacing device worked from said body and adapted to cause a definite quantity of liquid reagent to pass by displacement from said tank to said mixing vessel each time said flushing apparatus operates.

6. Water-softening apparatus comprising a water-mixing vessel, an automatic intermittent water-flushing apparatus arranged to discharge into said mixing vessel, a liquid-reagent tank arranged to discharge into said mixing vessel, a displacing device controlled by the rise and fall of water admitted to and discharged from said flushing apparatus for causing a definite quantity of liquid reagent to pass from said tank to said mixing vessel each time said flushing apparatus is operated, and a settling-tank provided with an outlet and into which said mixing vessel discharges.

7. Water-softening apparatus comprising a mixing vessel and reagent-tank arranged side by side and connected together at their upper ends, an automatic water-flushing device arranged at a higher level and having its outlet arranged to discharge into said mixing vessel, a float arranged in said flushing apparatus, a water-inlet pipe connected to the lower end of said reagent-tank and provided with a valve, a float arranged in said tank and adapted to control said valve according to the height of the liquid reagent in said tank, and a displacing device arranged to dip into the liquid reagent in said tank and to be worked from the float in said flushing apparatus, substantially as described.

8. Water-softening apparatus comprising a mixing vessel, an automatic water-flushing apparatus arranged to discharge into said mixing vessel and provided with a vertically-movable body arranged to be raised and lowered by the entry and exit of water to and from said flushing apparatus, and a liquid-reagent tank provided with a pump adapted to be worked from said vertically-movable body and arranged to discharge into said mixing vessel.

9. Water-softening apparatus comprising a mixing vessel and a settling-tank arranged one above the other, the mixing vessel having a discharge-pipe terminating within and near to the bottom of said settling-tank, and said tank having an outlet near the top, an automatic siphon flushing apparatus connected to a hard-water-supply pipe and arranged to discharge into said mixing vessel, a float arranged in said flushing apparatus, a reagent-tank arranged at a lower level than said flushing apparatus, a water-inlet pipe connected to the lower end of said reagent-tank and provided with a valve, a float arranged in said reagent-tank and connected to said valve, and means connected to the float in said flushing apparatus and adapted to cause a definite quantity of liquid to pass from said reagent-tank to said mixing vessel each time said flushing apparatus acts to discharge water into said mixing vessel.

10. Water-softening apparatus comprising a mixing vessel and a settling-tank arranged one above the other, the mixing vessel having a discharge-pipe terminating within and near to the bottom of said settling-tank, and said tank having an outlet near the top, an automatic siphon flushing apparatus connected to a hard-water-supply pipe and arranged to discharge into said mixing vessel, a float arranged in said flushing apparatus, a reagent-tank arranged at a lower level than said flushing apparatus, a water-inlet pipe connected to the lower end of said reagent-tank and provided with a valve, a float arranged in said reagent-tank and connected to said valve, and a displacing-body connected to the float in said flushing apparatus and arranged to dip into the liquid reagent in said tank each time the said float descends.

11. Water-softening apparatus comprising a mixing vessel, a liquid-reagent vessel connected at its upper end to said mixing vessel and having its interior of gradually-decreasing cross-sectional area toward the bottom, a water-inlet pipe connected to the lower end of said tank and provided with a valve, a float arranged in said tank and adapted to control said valve, an automatic water-flushing apparatus arranged above said mixing vessel and reagent-tank and so as to discharge into said vessel, a vertically-movable body located in said flushing apparatus, and means connected to said float and adapted to cause a definite quantity of liquid reagent to pass from said tank to said mixing vessel each time said flushing apparatus discharges into said mixing vessel.

Signed at 75, 76, and 77 Cornhill, London, England, this 11th day of July, 1902.

STANLEY HOWARD HODGKIN.

Witnesses:
PERCY E. MATTOCKS,
HUGH HUGHES.